United States Patent
Beneze

[15] 3,695,808
[45] Oct. 3, 1972

[54] APPARATUS FOR MAKING TIRES
[72] Inventor: Heinz Wilhelm Beneze, Akron, Ohio
[73] Assignee: The Firestone Tire & Rubber Company, Akron, Ohio
[22] Filed: April 27, 1970
[21] Appl. No.: 43,281

Related U.S. Application Data

[62] Division of Ser. No. 796,466, Feb. 4, 1969, Pat. No. 3,555,141.

[52] U.S. Cl. ............425/426, 264/311, 425/35, 425/242
[51] Int. Cl. ............B29c 5/00, B29h 3/08
[58] Field of Search ............264/311; 25/30 C, 30 R; 18/26 RR, 42 D, 42 T, 42 M

[56] References Cited

UNITED STATES PATENTS

| | | |
|---|---|---|
| 2,860,379 | 11/1958 | Beckadolph et al. ...264/311 X |
| 3,200,180 | 8/1965 | Russ et al................264/311 X |
| 1,504,497 | 8/1924 | Perry....................25/30 C UX |
| 1,750,748 | 3/1930 | Edmunds..........25/30 RR UX |
| 3,371,387 | 3/1968 | Cleereman et al.........18/42 D |
| 2,686,554 | 8/1954 | Hinman...............18/42 T UX |
| 1,750,748 | 3/1930 | Edmunds.............25/30 RR X |

FOREIGN PATENTS OR APPLICATIONS 1,489,168  6/1967  France.......................18/42 T
445,790   4/1936  Great Britain...........25/30 RR Primary Examiner—J. Howard Flint, Jr.
Attorney—S. M. Clark and Gordon B. Seward

[57] ABSTRACT

An apparatus for making tires which include a separable mold which has an inner surface which defines the outer shape of a tire to be formed. A generally flat paddle shaped template member extends generally radially within the mold when it is assembled and the cross sectional shape of the tire is determined by the space between the template and the inner surface of the mold. The mold is rotated about its axis while the template member is preferably held in a fixed position. A flowable and hardenable elastomeric material suitable for use in constructing tires (such as polyurethane) is introduced into the rotating mold and centrifugal force urges the flowable material to the inner surface of the mold and when sufficient elastomeric material has been added, the wiping action of the template member on the elastomeric material forms the inner shape of the tire. The material hardens and the mold, the template member and finished tire are separated. The template member is preferably held in a fixed position, however, it may be rotated at a slower speed than the mold or in a reverse direction.

10 Claims, 3 Drawing Figures

PATENTED OCT 3 1972 3,695,808

SHEET 1 OF 2

APPARATUS FOR MAKING TIRES

This application is a division of my application Ser. No. 796,466, filed Feb. 4, 1969, now U.S. Pat. No. 3,555,141.

The prior art has employed a rotating mold which has a large, bulky core located therein so as to form the profile of the tire. The disadvantage of this construction has been primarily the size and awkwardness of the core as well as the difficulty in removing the core from the formed tire. The present invention lends itself to solving these disadvantages in that the large core is replaced by one or more small, preferably flat, template members which are positioned within the mold and extend in a generally radial direction with respect thereto. The space between the template members and the mold controls the shape of the tire which is formed. The template members are easy to handle and easy to remove from the finished tire.

An object of the present invention is to provide an improved apparatus for producing synthetic tires, particularly of polyurethane.

Another object of the present invention is to provide an apparatus for making tires, particularly of the pneumatic type, which utilize a rotating mold and a relatively stationary template member whereby flowable and hardenable elastomeric material is thrown against the inner surface of the mold by centrifugal force to form the outer shape of the tire and as the volume of elastomeric material is increased the inner shape of the tire is determined by the wiping action of the template member against the elastomeric material.

Other objects and a fuller understanding of this invention may be had by referring to the following description and claims, taken in conjunction with the accompanying drawings, in which:

Figure 1:
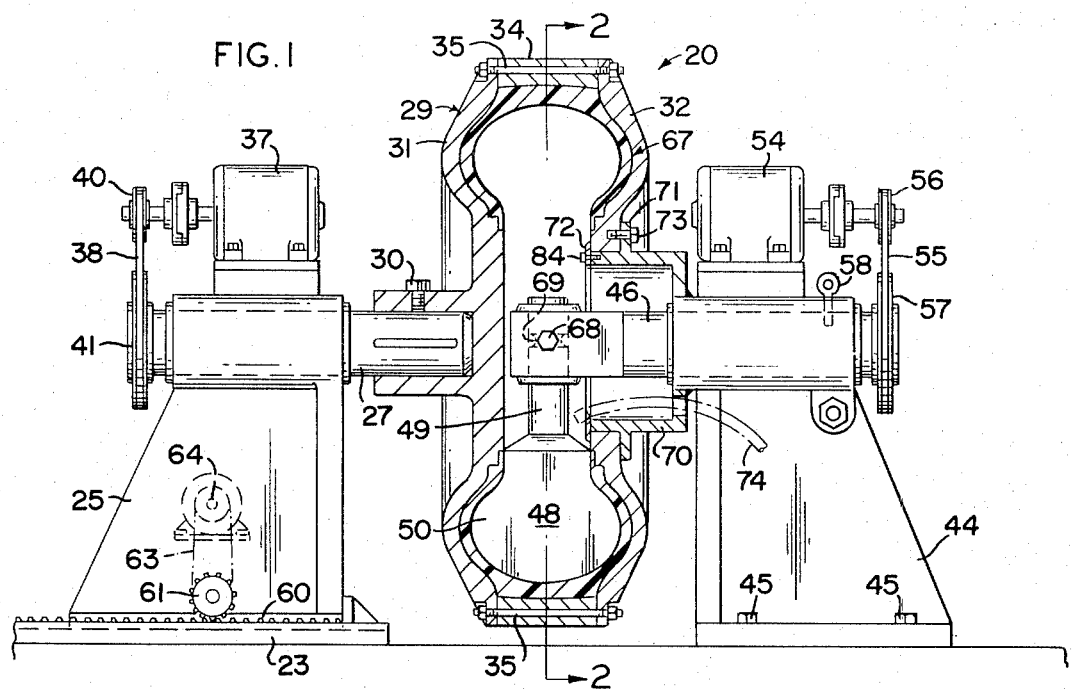
FIG. 1 is an elevational view partially in section of the apparatus of the present invention.

Referring to the drawings, the apparatus of the present invention has been indicated generally by the reference numeral 20 and as will be seen, includes a base 23 which serves to mount a pedestal support 25. The pedestal support 25 mounts a sleeve bearing which has been unidentified, and this sleeve bearing serves to rotatably support a shaft 27. The right end of the shaft 27 as seen in FIG. 1 serves to rotatably support a mold assembly identified generally by the reference numeral 29. The mold assembly 29 includes a first side member 31 which is fixed to the shaft 27 by means of a bolt 30 and a second side member 32 is located in axially spaced relation to the side member 31. These two side members 31 and 32 are held in position in the assembled condition by means of a ring member 34 and connecting bolts 35 which extend through both side members and the ring member.

An electric motor 37 is supported on the pedestal 25 and serves to rotatively drive the shaft 27 by means of a pulley 38 which extends between sheave members 40 and 41, respectively connected to the motor shaft and the shaft 27.

Figure 2:
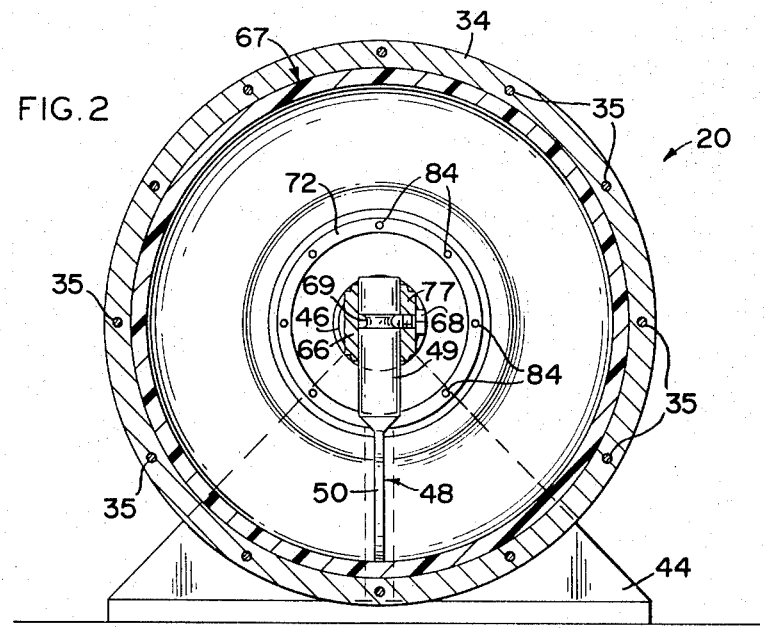
FIG. 2 is a view taken generally along the line 2—2 of FIG. 1.

A second pedestal support 44 is located on the other side of the mold assembly from pedestal support 25 and this pedestal support is fixedly secured to a floor or other rigid member by suitable fasteners 45. The pedestal support 44 includes a sleeve bearing, not numbered, which serves to mount a shaft 46. A paddle-shaped template member 48 is provided which has first and second end portions 49 and 50, respectively. In the assembled condition of the apparatus, the template member 48 assumes the position of FIGS. 1 and 2 and as will be noted, the template member is connected to the left end of shaft 46. The connection is best seen in FIG. 2 and it will be seen that the end portion 49 is cylindrical in configuration and resides between portions 66 and 77 which are integrally connected to shaft 46. A set screw 68 extends through portion 66 and into an annular groove 69 on 49. When screw 68 is tightened the position of template member 48 is fixed and when loosened it may be rotated about its length axis and it may pivot with respect to shaft 46 about the axis of set screw 68. An attachment housing 70 is welded to the sleeve bearing which supports shaft 46 and has first and second flanges 71 and 72 which are located on either side of side member 32 as best seen in FIG. 1. A bolt 73 extends through flange 71 and into member 32 and a bolt 84 extends through flange 72 and into member 70 when the mold is to be separated (See FIG. 3), however, when the mold is to be rotated in its assembled condition the bolt 73 is removed. When rotated the side member 32 moves between the fixed flanges 71 and 72.

A motor 54 is supported by the pedestal 44 and is adapted to rotatively drive (in either direction) the shaft 46 when desired by a drive train consisting of a pulley 55 connected to sheaves 56 and 57. In most instances, the shaft 46 is not rotated, but rather is held in a fixed position and this can be accomplished by means of an operator dropping a pin 58 into aligned openings in the shaft 46 and in the pedestal support 44.

In order to produce a pneumatic tire with the apparatus of the present invention, the mold assembly 29 is rotatively driven by the motor 37 and while being so rotated the template member 48 is held in a fixed position relative thereto. A flowable and hardenable elastomeric material is introduced into the interior of the mold assembly through a conduit 74 which extends into the housing 70 and centrifugal force serves to throw this flowable elastomeric material outwardly against the ring member 34. As more material is added, the space which is provided between the second end portion 50 of the template member and the mold assembly begins to fill up until the cross section of the tire 67 which is shown in FIG. 1 is completely formed. It will be seen that the outer configuration of the tire is formed by the inner surface of the ring member 34 and side members 31 and 32. The inner surface of the pneumatic tire is formed by the shape of the end portion 50 of the template member 48 and the wiping action thereof on the elastomeric material. As the flowable elastomeric material is continually rotated, it begins to harden and finally hardens or cures to a point that the shape of the tire is self-supporting and the template member may be removed.

Figure 3:
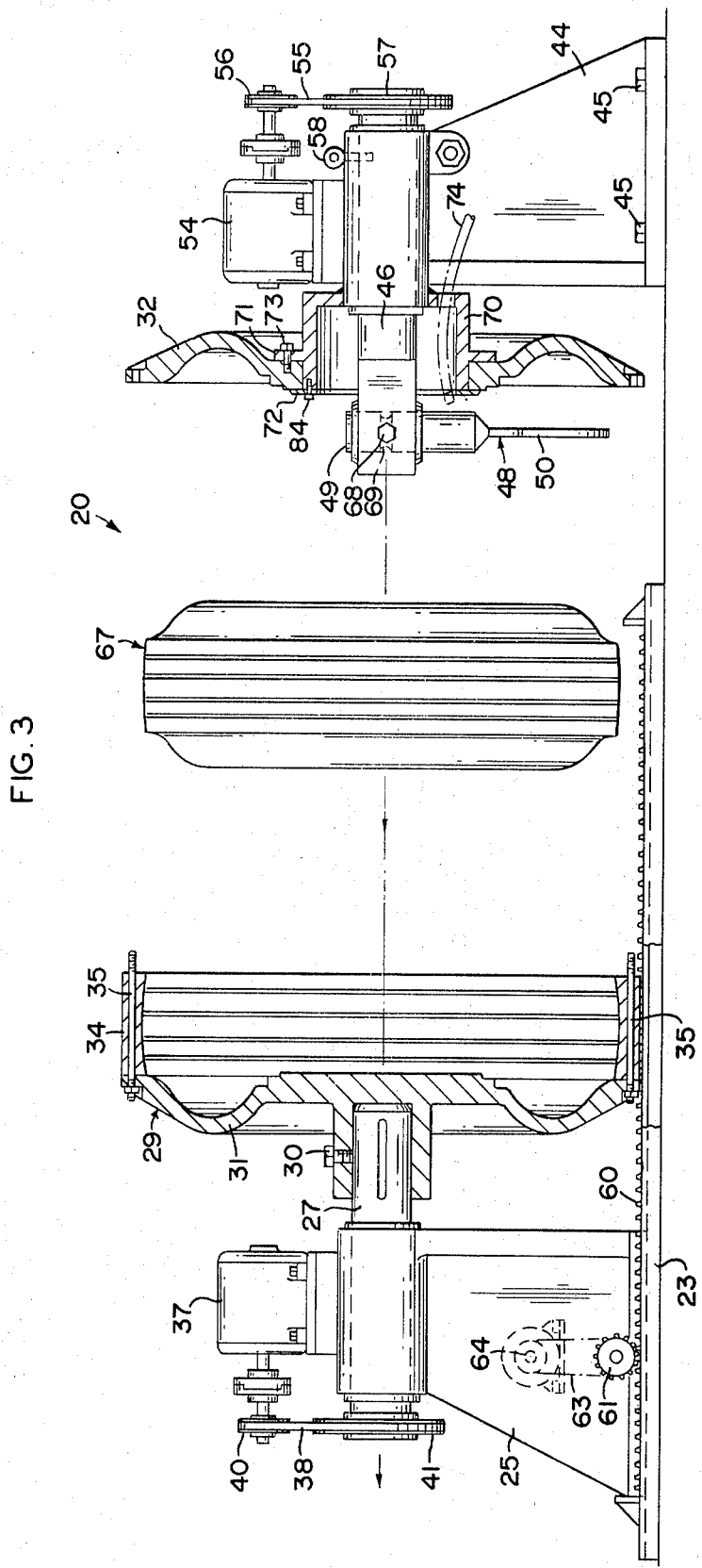
FIG. 3 is a view similar to FIG. 1 but showing the apparatus in the process of being disassembled.

When this point has been reached, the set screw 68 is loosened by a wrench and access is provided through an opening (in housing 70) which has not been shown. The template member is then rotated about its length axis 90° to the position shown in FIG. 3. The pedestal support 25 which rests upon the base 23 is movable relative thereto. This is accomplished by means of a rack gear 60 being fixedly secured to the base 23 and a pinion gear 61 meshing therewith and rotatively supported by the pedestal support 25. The pinion gear 61 is rotatively driven by way of a shaft 64 in turn driven from a power source not shown and a chain 63 interconnected with the pinion gear. It will therefore be clear that in order to remove the template member after the tire has hardened sufficiently to support itself, it is necessary to disconnect the connecting bolts 35 and move the pedestal support 25 to the left as shown in FIG. 3 by rotatively driving the pinion gear 61. It will be seen that the second end portion 50 of the template member 48 separates from the finished tire by simply pivoting about the screw 68 and coming out the opening in the tire. Before the tire is removed from the mold it is usually cured further either with or without heat.

In order to demonstrate the use of the present apparatus in the method of producing a pneumatic tire, a flowable and hardenable elastomeric material polyurethane was utilized. The mold assembly 29 was driven at approximately 700 rpm and the polyurethane which had the following characteristics, was added to the mold assembly over a period of approximately 3 minutes. The polyurethane utilized comprised 100 parts of a pre polymer (Adiprene 1167), having a Brookfield viscosity of 5,000–7,000 centipoises at 86° F and 250–350 centipoises at 212° F and mixed with 20 parts of dioetylphthlate and 20 parts of MOCA (4,4' methylene-bis(2 chloroaniline). The overall viscosity entering the mold was 200–1,000 centipoises. After an additional period of time, the pneumatic tire had been sufficiently formed and was hardened to a condition where it would support the formed shape. It will be apparent to those skilled in the art that satisfactory flowable and hardenable materials other than polyurethane might be utilized (such as vinyl plastisols and nylon) in a manner which would not depart from the teachings of the present invention.

It is preferred that the template member 48 be held in a fixed position, however, it will be clear that the template member may be rotated by means of the motor 54 and the drive train, at a slower speed than the mold assembly 29 or it may be rotated in the opposite direction.

From a review of the above, it will be readily apparent to those skilled in the art that a new and highly advantageous apparatus for making pneumatic tires has been disclosed and that the objects of this invention as hereinabove enumerated are readily carried out.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. Apparatus for molding tires including in combination a mold having an inner surface and comprising first and second axially spaced side members connected at their outer peripheries by a ring member, means mounting said mold for rotation about its axis with said axis being disposed generally in a horizontal plane, means for rotating said mold about its horizontal axis wall means defining an opening to the interior of said mold for introducing flowable and hardenable material suitable for use in constructing tires thereinto, at least one template member positioned within said mold and extending therein in a generally radial direction, said template member comprising a plate member having an outer perimetric surface which conforms to the inner cross sectional shape of the tire to be molded and having a relatively small thickness dimension in the circumferential direction of the mold, the shape of the tire being determined by the space between the perimetric surface of said template member and said inner surface of said mold.

2. Apparatus for molding tires as claimed in claim 1, wherein means are provided for fixedly locating said template member within said mold during rotation of the mold.

3. Apparatus for molding tires as claimed in claim 1, wherein means are provided for rotating said template relative to said mold.

4. Apparatus for molding tires as claimed in claim 1, wherein means are provided for supporting said template member which permits said template member to be rotated about its generally radical direction length axis when desired.

5. Apparatus for molding tires including in combination a mold having an inner surface which defines the outer shape of a tire, means mounting said mold for rotation about its axis, means for rotating said mold about its axis, wall means defining an opening to the interior of said mold for introducing flowable and hardenable elastomeric material thereinto, at least one template member positioned within said mold and extending therein in a generally radial direction, said template member comprising a plate member having an outer perimetric surface which conforms to the inner cross sectional shape of the tire to be molded and having a relatively small thickness dimension in the circumferential direction of the mold, the shape of the tire being determined by the space between said perimetric surface of said template member and said inner surface of said mold.

6. Apparatus for molding tires as claimed in claim 5, wherein means are provided for fixedly locating said template member within said mold during rotation of the same.

7. Apparatus for molding tires as claimed in claim 5, wherein means are provided for rotating said template member relative to said mold.

8. Apparatus for molding tires as claimed in claim 5, wherein means are provided for supporting said template member which permits said template member to be rotated about its generally radial direction length axis when desired.

9. Apparatus for molding tires as claimed in claim 5, wherein said mold has a circumferentially extending opening thereinto having a width dimension in the axial direction of said mold, the thickness dimension of said plate member being less than said width dimension of said circumferentially extending opening.

10. Apparatus for molding tires as claimed in claim 1, wherein said mold has a circumferentially extending opening thereinto having a width dimension in the axial direction of said mold, the thickness dimension of said plate member being less than said width dimension of said circumferentially extending opening.

* * * * *